United States Patent
Hu et al.

(10) Patent No.: US 11,115,801 B2
(45) Date of Patent: Sep. 7, 2021

(54) TRAFFIC OFFLOADING METHOD AND RELATED DEVICE IN ROAMING SCENARIO

(71) Applicant: HUAWEI TECHNOLOGIES CO., LTD., Guangdong (CN)

(72) Inventors: Xiang Hu, Beijing (CN); Yuan Xia, Beijing (CN); Han Zhou, Shanghai (CN); Quan Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/804,262

(22) Filed: Feb. 28, 2020

(65) Prior Publication Data

US 2020/0204976 A1    Jun. 25, 2020

Related U.S. Application Data

(63) Continuation of application No. PCT/CN2018/089922, filed on Jun. 5, 2018.

(30) Foreign Application Priority Data

Aug. 31, 2017    (CN) .......................... 201710776563.3

(51) Int. Cl.
*H04W 4/00* (2018.01)
*H04W 8/08* (2009.01)
(Continued)

(52) U.S. Cl.
CPC ............. *H04W 8/082* (2013.01); *H04W 8/12* (2013.01); *H04W 80/10* (2013.01); *H04W 84/045* (2013.01)

(58) Field of Classification Search
USPC ........................................ 370/328, 329, 330
See application file for complete search history.

(56) References Cited

U.S. PATENT DOCUMENTS

| | | | | |
|---|---|---|---|---|
| 9,473,928 | B2* | 10/2016 | Rajagopalan | ........... H04W 8/20 |
| 2011/0286384 | A1* | 11/2011 | Sugimoto | ............. H04W 80/04 |
| | | | | 370/328 |

(Continued)

FOREIGN PATENT DOCUMENTS

| CN | 101217806 A | 7/2008 |
|---|---|---|
| CN | 101227720 A | 7/2008 |

(Continued)

OTHER PUBLICATIONS

3GPP TR 23.799 V14.0.0 (Dec. 2016), 3rd Generation Partnership Project, Technical Specification Group Services and System Aspects, Study on Architecture for Next Generation System (Release 14), total 522 pages.

(Continued)

*Primary Examiner* — David Q Nguyen

(57) ABSTRACT

Embodiments of this application disclose an offloading method and a related device in a roaming scenario, to prevent traffic of a subscribed service of a roaming subscriber from looping back to a home location, thereby reducing inter-network traffic consumption. The method in this embodiment of this application includes: receiving, by a visited core network control plane V-CP, a first message from a home core network control plane H-CP, where the first message includes a local breakout LBO policy based on a subscribed service, and the subscribed service is a service on which local breakout needs to be performed and that is of a user; and sending, by the V-CP, the LBO policy to a visited core network user plane V-UP, so that the LBO policy is installed on the V-UP to implement local breakout processing for the subscribed service.

17 Claims, 9 Drawing Sheets

(51) Int. Cl.
*H04W 8/12* (2009.01)
*H04W 80/10* (2009.01)
*H04W 84/04* (2009.01)

(56) References Cited

U.S. PATENT DOCUMENTS

| | | | |
|---|---|---|---|
| 2012/0106508 A1 | 5/2012 | Zhou et al. | |
| 2015/0230074 A1 | 8/2015 | Zeng et al. | |
| 2015/0327150 A1 | 11/2015 | Jung et al. | |
| 2019/0028992 A1 | 1/2019 | Kim et al. | |

FOREIGN PATENT DOCUMENTS

| | | | | |
|---|---|---|---|---|
| CN | 101785267 A | 7/2010 | | |
| CN | 102143530 A | 8/2011 | | |
| CN | 102595367 A | 7/2012 | | |
| CN | 102904856 A | 1/2013 | | |
| CN | 103428684 A | 12/2013 | | |
| CN | 104113918 A | 10/2014 | | |
| CN | 104363573 A | 2/2015 | | |
| CN | 104871596 A | 8/2015 | | |
| EP | 2458913 A1 * | 5/2012 | ............ | H04W 76/11 |
| EP | 2827625 A1 | 1/2015 | | |
| JP | 2016535963 A | 10/2017 | | |
| WO | 2009024182 A1 | 2/2009 | | |
| WO | 2011006317 A1 | 1/2011 | | |
| WO | 2014079514 A1 | 5/2014 | | |
| WO | 2017039187 A1 | 3/2017 | | |

OTHER PUBLICATIONS

S2-176200 Ericsson, "TS 23.501: Proposal to align LBO roaming with GSMA NG Packet", SA WG2 Meeting #122bis, Aug. 21-25, 2017, Sophia Antipolis, France, total 12 pages.

Catt, "23.502: Update PDU Session Establishment flow for QoS-related subscription data", 3GPP TSG SA WG2 #122BIS, S2-176542, Aug. 21-25, 2017, total 13 pages.

Notice of Reasons for Rejection issued in JP Application No. 2020-510514, dated May 11, 2021 with English translation, total 8 pages.

\* cited by examiner

TRAFFIC OFFLOADING METHOD AND RELATED DEVICE IN ROAMING SCENARIO

CROSS-REFERENCE TO RELATED APPLICATIONS

This application is a continuation of International Patent Application No. PCT/CN2018/089922, filed on Jun. 5, 2018, which claims priority to Chinese Patent Application No. 201710776563.3, filed on Aug. 31, 2017, The disclosures of the aforementioned applications are hereby incorporated by reference in their entireties.

TECHNICAL FIELD

This application relates to the field of communications technologies, and in particular, to a traffic offloading method and a related device in a roaming scenario.

BACKGROUND

Currently, when using a terminal, a user may leave a home location of the terminal. In this case, the terminal needs to perform accessing at a roaming location of the user, to ensure that the terminal normally accesses a network. To ensure service continuity in a case of subscriber roaming handover, a networking connection needs to be established between operator networks and a roaming agreement needs to be reached. In compliance with the roaming agreement reached by the operators, the operators configure a roaming control policy, to perform admission control on network access of a roaming subscriber and perform corresponding operation management on a roaming service.

In a current 2G/3G/4G/4.5G network architecture, when a user roams to a network of another operator, in a user data service, home routing is usually selected for access and the home location is returned to for access. In this case, as shown in FIG. 1A, even if the user accesses a local service at a roaming location, the user needs to detour to the roaming location from the home location. As shown in FIG. 1B, the user may alternatively select a local breakout at the roaming location for access, and consequently, a delay and relatively low service quality are caused when the user of the terminal accesses a service at a home location.

When the technical solution is used, over the top (OTT) service providers or content providers that provide various application services to the user through Internet deploy a content delivery network (CDN) server nearby the home location to implement local breakout, thereby improving service access quality and reducing consumed inter-network traffic. In this scenario, all service traffic loops back to a home core network user plane (H-UP), then is offloaded to a Gi side, and loops back to a visited CDN server through the Internet. Consequently, a large amount of inter-network traffic is consumed and a service access delay is increased.

SUMMARY

Embodiments of this application provide an offloading method and a related device in a roaming scenario, to prevent traffic of a subscribed service of a roaming subscriber from looping back to a home location, thereby reducing inter-network traffic consumption, implementing a local breakout capability of a terminal at a roaming location, and improving service quality.

A first aspect of an embodiment of this application provides an offloading method in a roaming scenario, where the method includes: receiving, by a visited core network control plane V-CP, a first message sent by a home core network control plane H-CP, where the first message includes a local breakout LBO policy based on a subscribed service, and the subscribed service is a service on which local breakout needs to be performed and that is of a user; and sending, by the V-CP, the LBO policy to a visited core network user plane V-UP, so that the LBO policy is installed on the V-UP to implement local breakout processing for the subscribed service. In this embodiment of this application, the local breakout policy of the subscribed service sent by the H-CP is received by using the V-CP, the local breakout policy is delivered to the V-UP for installation, thereby implementing offloading of the subscribed service of the terminal at the roaming location, reducing inter-network traffic consumption between the roaming location and the home location, implementing a local breakout capability of the terminal at the roaming location, and improving service quality.

In a first possible implementation of the first aspect of this embodiment of this application, the receiving, by a visited core network control plane V-CP, a first message sent by a home core network control plane H-CP includes: receiving, by the V-CP by using a visited session management function V-SMF entity, a first message sent by a home session management function H-SMF entity, where the first message includes the LBO policy based on the subscribed service; or receiving, by the V-CP by using a visited policy control function V-PCF entity, a first message sent by a home policy control function H-PCF entity, where the first message includes the LBO policy based on the subscribed service. In this embodiment of this application, a process in which the V-CP receives the local breakout policy is refined, and this embodiment of this application is easier to implement and operate.

In a second possible implementation of the first aspect of this embodiment of this application, after the receiving, by the V-CP by using a visited session management function V-SMF entity, a first message sent by a home session management function H-SMF entity, and before the sending, by the V-CP, the LBO policy to a visited core network user plane V-UP, the method further includes: sending, by the V-CP, the LBO policy to the visited policy control function V-PCF entity by using the V-SMF; or determining, by the V-CP by using the V-PCF, whether the LBO policy is valid. In this embodiment of this application, a process in which the V-CP authenticates the local breakout policy is added, and a possible implementation of this embodiment of this application is added.

In a third possible implementation of the first aspect of this embodiment of this application, after the receiving, by the V-CP by using a visited policy control function V-PCF entity, a first message sent by a home policy control function H-PCF entity, and before the sending, by the V-CP, the LBO policy to a visited core network user plane V-UP, the method further includes: determining, by the V-CP by using the V-PCF, whether the LBO policy is valid. In this embodiment of this application, a process in which the V-CP authenticates the local breakout policy is added, and a possible implementation of this embodiment of this application is added.

In a fourth implementation of the first aspect of this embodiment of this application, the sending, by the V-CP, the LBO policy to a visited core network user plane V-UP includes: sending, by the V-CP, the LBO policy to the V-UP by using the V-SMF. In this embodiment of this application, a process in which the V-CP sends the local breakout policy by using the V-SMF is refined, and this embodiment of this application is easier to implement and operate.

A second aspect of an embodiment of this application provides an offloading method in a roaming scenario, where the method includes: obtaining, by a home core network control plane H-CP, a local breakout LBO policy based on a subscribed service, where the subscribed service is a service on which local breakout needs to be performed and that is of a user; and sending, by the H-CP, a first message to a visited core network control plane V-CP, where the first message includes the LBO policy. In this embodiment of this application, the local breakout policy of the subscribed service is obtained by using the H-CP, the local breakout policy of the subscribed service is sent to the V-CP, thereby implementing offloading of the subscribed service of the terminal at the roaming location, reducing inter-network traffic consumption between the roaming location and the home location, implementing a local breakout capability of the terminal at the roaming location, and improving service quality.

In a first possible implementation of the second aspect of this embodiment of this application, the sending, by the H-CP, a first message to a visited core network control plane V-CP includes: sending, by the H-CP, a first message to a visited session management function V-SMF entity by using a home session management function H-SMF entity, where the first message includes the LBO policy. In this embodiment of this application, a specific process in which the H-CP sends the local breakout policy is refined, and this embodiment of this application is easier to implement and operate.

In a second possible implementation of the second aspect of this embodiment of this application, the sending, by the H-CP, a first message to a visited core network control plane V-CP includes: sending, by the H-CP, the first message to a visited policy control function V-PCF entity by using a home policy control function H-PCF entity, where the first message includes the LBO policy. In this embodiment of this application, a specific process in which the H-CP sends the local breakout policy is refined, and this embodiment of this application is easier to implement and operate.

In a third possible implementation of the second aspect of this embodiment of this application, the obtaining, by a home core network control plane H-CP, a local breakout LBO policy based on a subscribed service includes: configuring, by the H-CP, the LBO policy by using the home session management function H-SMF entity; receiving, by the H-CP, a second message sent by a home application server H-AS, where the second message includes the LBO policy; or obtaining, by the H-CP, the LBO policy from the home policy control function H-PCF entity. In this embodiment of this application, a specific manner in which the H-CP obtains the local breakout policy is refined, and this embodiment of this application is easier to implement and operate.

In a fourth possible implementation of the second aspect of this embodiment of this application, the first message includes grant information of a roaming operator. In this embodiment of this application, a composition of the first message is limited, so that steps of this embodiment of this application are more complete.

A third aspect of an embodiment of this application provides an offloading method in a roaming scenario, where the method includes: obtaining, by a home core network control plane H-CP, a local breakout LBO policy based on a subscribed service, where the subscribed service is a service on which local breakout needs to be performed and that is of a user; and sending, by the H-CP, a first message to a visited local user plane V-Local-UP, where the first message includes the LBO policy, so that traffic of the subscribed service is offloaded to a visited application server V-AS. In this embodiment of this application, the local breakout policy of the subscribed service is obtained by using the H-CP, the local breakout policy of the subscribed service is sent to the V-Local-UP, thereby implementing offloading of the subscribed service at the roaming location, reducing inter-network traffic consumption between the roaming location and the home location, implementing a local breakout capability of the terminal at the roaming location, and improving service quality.

In a first possible implementation of the second aspect of this embodiment of this application, the sending, by the H-CP, a first message to a visited local user plane V-Local-UP includes: sending, by the H-CP, the first message to the visited local user plane V-Local-UP by using a home session management function H-SMF entity. In this embodiment of this application, a specific process in which the H-CP sends the first message is refined, and this embodiment of this application is easier to implement and operate.

A fourth aspect of this embodiment of this application provides an offloading method in a roaming scenario, where the method includes: receiving, by a visited local user plane V-Local-UP, a local breakout LBO policy that is based on a subscribed service and that is sent by the home core network control plane H-CP, where the subscribed service is a service on which local breakout needs to be performed and that is of a user; installing, by the V-Local-UP, the LBO policy; and if the V-Local-UP determines that a service sent by the visited core network user plane V-UP is the subscribed service, offloading, by the V-Local-UP, traffic of the subscribed service to the visited application server V-AS. In this embodiment of this application, the local breakout policy of the subscribed service sent by the H-CP is received by using the V-Local-UP, the local breakout policy is installed on the V-Local-UP, thereby implementing offloading of the subscribed service at the roaming location, reducing inter-network traffic consumption between the roaming location and the home location, implementing a local breakout capability of the terminal at the roaming location, and improving service quality.

In a first possible implementation of the fourth aspect of this embodiment of this application, the receiving, by a visited local user plane V-Local-UP, a local breakout LBO policy that is based on a subscribed service and that is sent by the home core network control plane H-CP includes: receiving, by the V-Local-UP, a local breakout LBO policy that is based on the subscribed service and that is sent by the home session management function H-SMF entity. In this embodiment of this application, a specific process in which the V-Local-UP receives the first message is refined, and this embodiment of this application is easier to implement and operate.

A fifth aspect of an embodiment of this application provides a network device, where the network device includes: a receiving unit, configured to receive a first message sent by a home core network control plane H-CP, where the first message includes a local breakout LBO policy based on a subscribed service, and the subscribed service is a service on which local breakout needs to be performed and that is of a user; and a first sending unit, configured to send the LBO policy to a visited core network user plane V-UP, so that the LBO policy is installed on the V-UP to implement local breakout processing for the subscribed service. In this embodiment of this application, the local breakout policy of the subscribed service of the terminal that is sent by the H-CP is received by using the V-CP, the local breakout policy is delivered to the V-UP for installation, thereby implementing offloading of the subscribed service of the terminal at the roaming location, reducing inter-network traffic consumption between the roaming location and the home location, implementing a local breakout capability of the terminal at the roaming location, and improving service quality.

In a first possible implementation of the fifth aspect of this embodiment of this application, the receiving unit is specifically configured to: receive, by using a visited session management function V-SMF entity, a first message sent by a home session management function H-SMF entity, where the first message includes the LBO policy based on the subscribed service; or receive, by using a visited policy control function V-PCF entity, a first message sent by a home policy control function H-PCF entity, where the first message includes the LBO policy based on the subscribed service. In this embodiment of this application, a process in which the V-CP receives the local breakout policy is refined, and this embodiment of this application is easier to implement and operate.

In a second possible implementation of the fifth aspect of this embodiment of this application, after the receiving, by the V-CP by using a visited session management function V-SMF entity, a first message sent by a home session management function H-SMF entity, and before the sending, by the V-CP, the LBO policy to a visited core network user plane V-UP, the network device further includes: a second sending unit, configured to send the LBO policy to the visited policy control function V-PCF entity by using the V-SMF; and a first determining unit, configured to determine, by using the V-PCF, whether the LBO policy is valid. In this embodiment of this application, a process in which the V-CP authenticates the local breakout policy is added, and a possible implementation of this embodiment of this application is added.

In a third possible implementation of the fifth aspect of this embodiment of this application, after the receiving, by the V-CP by using a visited policy control function V-PCF entity, a first message sent by a home policy control function H-PCF entity, and before the sending, by the V-CP, the LBO policy to a visited core network user plane V-UP, the network device further includes: a second determining unit, configured to determine, by using the V-PCF, whether the LBO policy is valid. In this embodiment of this application, a process in which the V-CP authenticates the local breakout policy is added, and a possible implementation of this embodiment of this application is added.

In a fourth possible implementation of the fifth aspect of this embodiment of this application, the first sending unit is specifically configured to send the LBO policy to the V-UP by using the V-SMF. In this embodiment of this application, a process in which the V-CP sends the local breakout policy by using the V-SMF is refined, and this embodiment of this application is easier to implement and operate.

A sixth aspect of an embodiment of this application provides a network device, where the network device includes: an obtaining unit, configured to obtain a local breakout LBO policy based on a subscribed service, where the subscribed service is a service on which local breakout needs to be performed and that is of a user; and a sending unit, configured to send a first message to a visited core network control plane V-CP, where the first message includes the LBO policy. In this embodiment of this application, the local breakout policy of the subscribed service is obtained by using the H-CP, the local breakout policy of the subscribed service is sent to the V-CP, thereby implementing offloading of the subscribed service of the terminal at the roaming location, reducing inter-network traffic consumption between the roaming location and the home location, implementing a local breakout capability of the terminal at the roaming location, and improving service quality.

In a first possible implementation of the sixth aspect of this embodiment of this application, the sending unit includes: a first sending subunit, configured to send a first message to a visited session management function V-SMF entity by using a home session management function H-SMF entity, where the first message includes the LBO policy. In this embodiment of this application, a specific process in which the H-CP sends the local breakout policy is refined, and this embodiment of this application is easier to implement and operate.

In a second possible implementation of the sixth aspect of this embodiment of this application, the sending unit includes: a second sending subunit, configured to send the first message to a visited policy control function V-PCF entity by using a home policy control function H-PCF entity, where the first message includes the LBO policy. In this embodiment of this application, a specific process in which the H-CP sends the local breakout policy is refined, and this embodiment of this application is easier to implement and operate.

In a third possible implementation of the sixth aspect of this embodiment of this application, the obtaining unit is specifically configured to: configure the LBO policy by using the home session management function H-SMF entity; receive a second message sent by a home application server H-AS, where the second message includes the LBO policy; or obtain the LBO policy from the home policy control function H-PCF entity. In this embodiment of this application, a specific manner in which the H-CP obtains the local breakout policy is refined, and this embodiment of this application is easier to implement and operate.

In a fourth possible implementation of the sixth aspect of this embodiment of this application, the first message includes grant information of a roaming operator. In this embodiment of this application, a composition of the first message is limited, so that steps of this embodiment of this application are more complete.

A seventh aspect of an embodiment of this application provides a network device, where the network device includes: an obtaining unit, configured to obtain a local breakout LBO policy based on a subscribed service, where the subscribed service is a service on which local breakout needs to be performed and that is of a user; and a sending unit, configured to send a first message to a visited local user plane V-Local-UP, where the first message includes the LBO policy, so that traffic of the subscribed service is offloaded to a visited application server V-AS. In this embodiment of this application, the local breakout policy of the subscribed service is obtained by using the H-CP, the local breakout policy of the subscribed service is sent to the V-Local-UP, thereby implementing offloading of the subscribed service at the roaming location, reducing inter-network traffic consumption between the roaming location and the home location, implementing a local breakout capability of the terminal at the roaming location, and improving service quality.

In a first possible implementation of the seventh aspect of this embodiment of this application, the sending unit is specifically configured to: send the first message to the visited local user plane V-Local-UP by using a home session management function H-SMF entity. In this embodiment of this application, a specific process in which the H-CP sends the first message is refined, and this embodiment of this application is easier to implement and operate.

An eighth aspect of the embodiment of this application provides a network device, where the network device includes: a receiving unit, configured to receive a local breakout LBO policy that is based on a subscribed service and that is sent by a home core network control plane H-CP, where the subscribed service is a service on which local breakout needs to be performed and that is of a user; an installation unit, configured to install the LBO policy; and an offloading unit, configured to: if the V-Local-UP determines that a service sent by a visited core network user plane V-UP is a subscribed service, offload traffic of the subscribed service to a visited application server V-AS. In this embodiment of this application, the local breakout policy of the subscribed service of the terminal sent by the H-CP is received by using the V-Local-UP, the local breakout policy of the subscribed service is installed on the V-Local-UP, thereby implementing offloading of the subscribed service at the roaming location, reducing inter-network traffic consumption between the roaming location and the home location, implementing a local breakout capability of the terminal at the roaming location, and improving service quality.

In a first possible implementation of the eighth aspect of this embodiment of this application, the receiving unit is specifically configured to: receive a local breakout LBO policy sent by a home session management function H-SMF entity. In this embodiment of this application, a specific process in which the V-Local-UP receives the first message is refined, and this embodiment of this application is easier to implement and operate.

A ninth aspect of this application provides a computer-readable storage medium. The computer-readable storage medium stores an instruction, and when the instruction runs on a computer, the computer is enabled to perform the method in each of the foregoing aspects.

A tenth aspect of this application provides a computer program product that includes an instruction, and when the computer program product runs on a computer, the computer is enabled to perform the methods in the foregoing aspects.

It can be learned from the foregoing technical solution that the embodiments of this application have the following advantages:

In the technical solution provided in the embodiments of this application, the visited core network control plane V-CP receives the first message sent by the home core network control plane H-CP, where the first message includes the local breakout LBO policy based on the subscribed service, and the subscribed service is the service on which the local breakout needs to be performed and that is of the user; and the V-CP sends the LBO policy to the visited core network user plane V-UP, so that the LBO policy is installed on the V-UP to implement the local breakout processing for the subscribed service. Traffic of a subscribed service of a roaming subscriber is prevented from looping back to the home location, inter-network traffic consumption is reduced, a local breakout capability of a terminal at a roaming location is implemented, and service quality is improved.

DESCRIPTION OF EMBODIMENTS

Embodiments of this application provide an offloading method and a related device in a roaming scenario, to prevent traffic of a subscribed service of a roaming subscriber from looping back to a home location, thereby reducing inter-network traffic consumption, implementing a local breakout capability of a terminal at a roaming location, and improving service quality.

To enable a person skilled in the art to understand the technical solutions in this application better, the following describes the technical solutions in the embodiments of this application with reference to the accompanying drawings in the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way are interchangeable in proper circumstances so that the example, non-limiting embodiments of the present invention described herein can be implemented in other orders than the order illustrated or described herein. In addition, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1A:
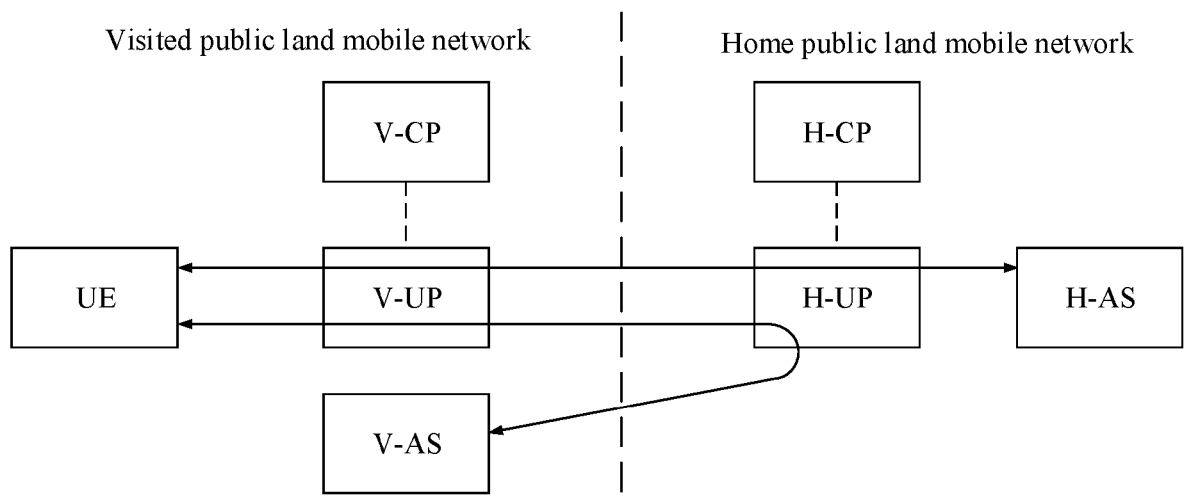
FIG. 1A is a schematic diagram of home routing access in a roaming scenario.
Figure 1B:
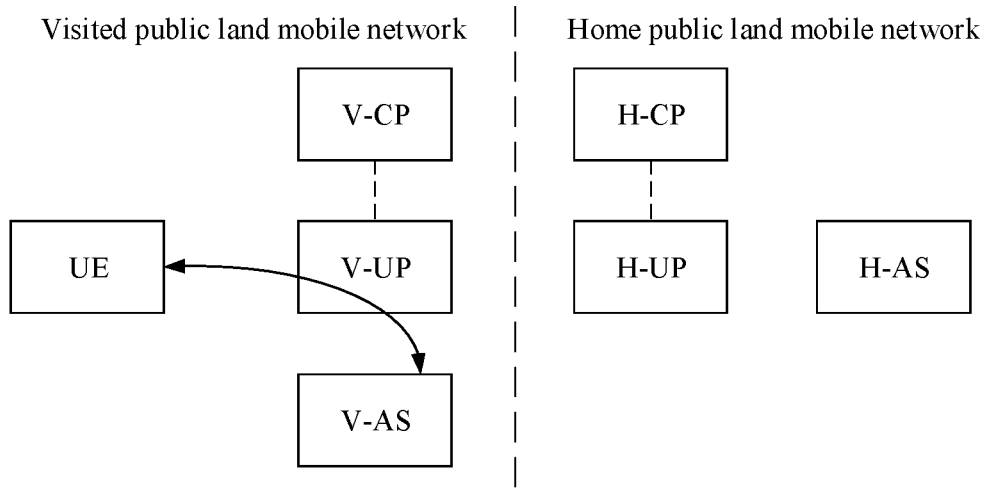
FIG. 1B is a schematic diagram of roaming local access in a roaming scenario.
Figure 2A:
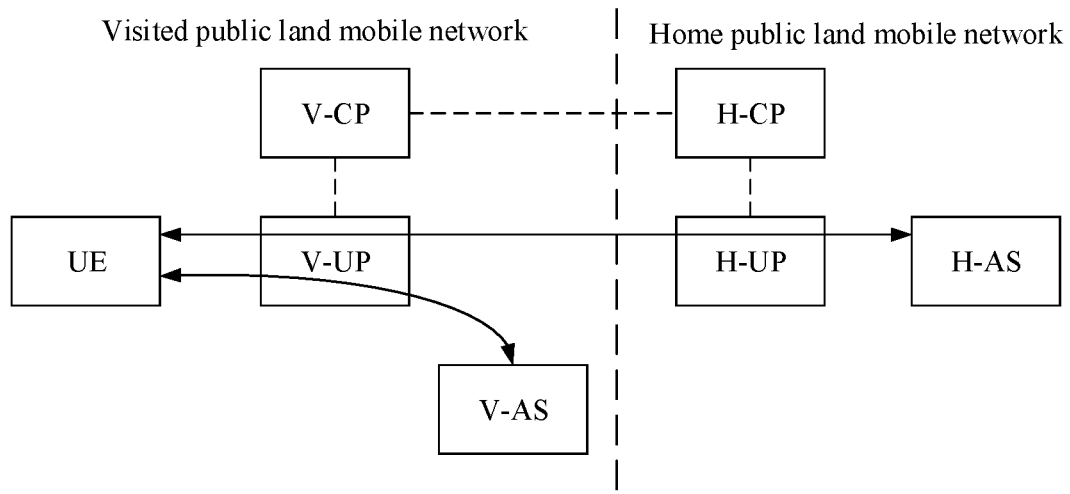
FIG. 2A is a schematic diagram of a network architecture to which this application is applied.
Figure 2B:
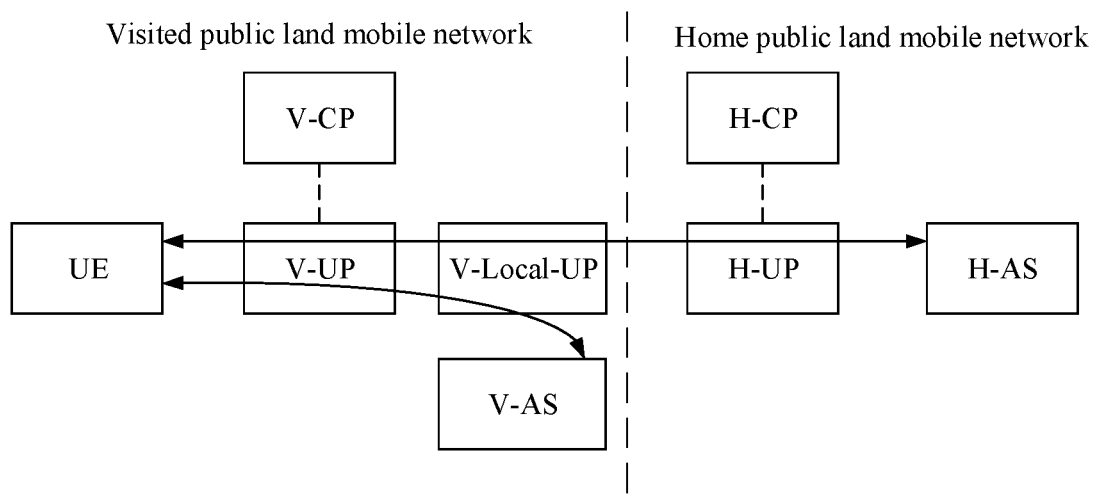
FIG. 2B is a schematic diagram of another network architecture to which this application is applied.

The embodiments of this application may be applied to the network architectures shown in FIG. 2A and FIG. 2B. In the network architecture shown in FIG. 2A, service opening and collaboration is supported between operators, a home operator subscribes to a corresponding service opening collaboration agreement with a roaming operator. A home core network control plane (H-CP) promotes a policy (and grant information) of a subscribed service to a visited core network control plane (V-CP), and the subscribed service may be a visited CDN service or another service. In this application, the visited CDN service is used as an example for description. After completing authentication by using a local policy control function (PCF) entity, the V-CP sends a received visited CDN policy to a visited core network user plane (visited user plane, V-UP). When a terminal subsequently accesses the service, traffic is offloaded by the V-UP to a visited application server (V-AS) by using a local breakout (LBO) policy. In the network architecture shown in FIG. 2B, the home operator subscribes with the roaming operator, and deploys a visited local user plane (V-Local-UP) at the roaming location. All user service flows belonging to the home location are first offloaded to the V-Local-UP, the home core network control plane H-CP may directly manage the V-Local-UP deployed at the roaming location, and the H-CP forwards the visited CDN policy (and grant information) to the V-Local-UP. When the terminal subsequently accesses the service, traffic is offloaded by the V-Local-UP to the visited application server (V-AS) by using the LBO policy. In this application, a visited CDN local breakout policy may alternatively be referred to as the LBO policy or the local breakout policy.

Figure 3:
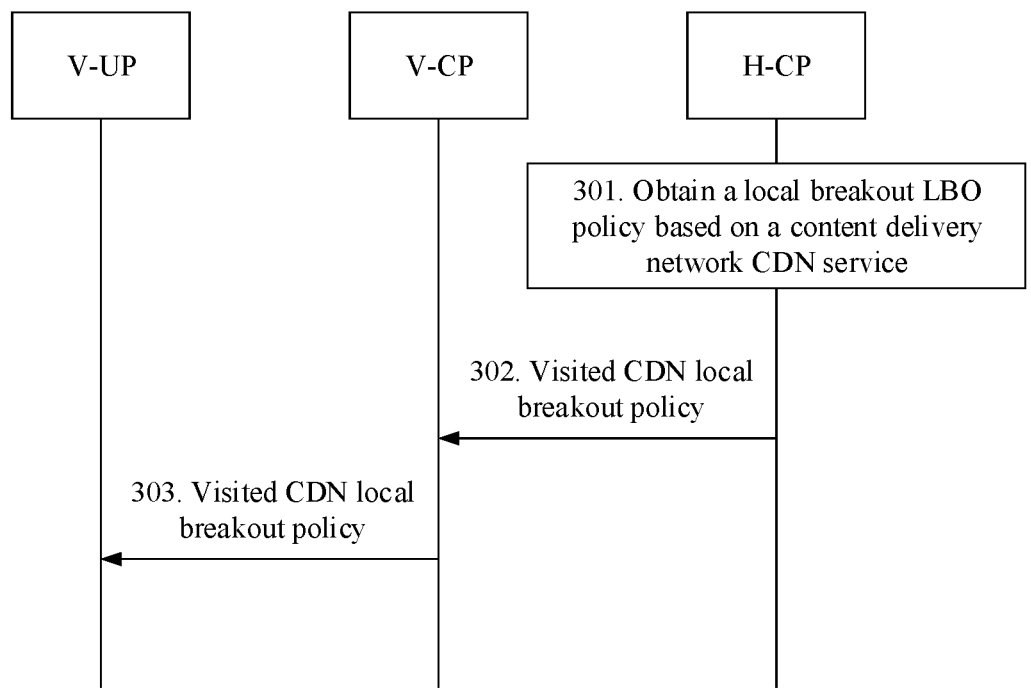
FIG. 3 is a schematic diagram of an embodiment of an offloading method in a roaming scenario according to an embodiment of this application.

For ease of understanding, in this embodiment and following embodiments of this application, an example in which the subscribed service is the visited CDN service is used for description. The following describes a specific procedure in this embodiment of this application. Referring to FIG. 3, when this embodiment is applied to the network architecture shown in FIG. 2A, an embodiment of an offloading method in a roaming scenario in this embodiment of this application includes the following steps.

301. A home core network control plane H-CP obtains a local breakout LBO policy based on a content delivery network CDN service.

The home core network control plane H-CP obtains the local breakout LBO policy based on the visited content delivery network CDN service. The LBO policy is used to offload, to a visited local application server V-AS, a service flow generated when a terminal accesses the visited CDN service.

It should be noted that there are a plurality of manners in which the H-CP obtains the LBO policy. For example, the H-CP may receive a message sent by a home application server H-AS, and the message carries a visited CDN local breakout policy; the H-CP may further configure the visited CDN local breakout policy by using a home session management function H-SMF entity; or the H-CP may further obtain a preset visited CDN local breakout policy from a home policy control function H-PCF entity. This is not specifically limited herein.

It may be understood that, before the H-CP obtains the visited CDN local breakout policy (namely, the LBO policy), a home operator has subscribed with a roaming operator, and the user terminal subscribes to a roaming local breakout service package of the home operator.

302. The H-CP sends a first message to a visited core network control plane V-CP, where the first message includes the LBO policy.

After obtaining a LBO policy of the user terminal, the H-CP sends the first message to the visited core network control plane V-CP, where the first message includes the LBO policy.

It should be noted that a network interface is opened between the H-CP and the V-CP, and supports transfer of the LBO policy of the roaming subscriber, to implement local breakout processing for the CDN service. The LBO policy can enable the terminal to directly perform local breakout on a visited core network user plane V-UP, so that a visited CDN server can be accessed without a need to return, to a home core network user plane H-UP, a data flow generated when the user terminal accesses the CDN service and loop the data flow back.

It may be understood that when authentication needs to be performed on the first message, the first message may further carry network identification information and grant information of the home operator, to perform authentication between the H-CP and the V-CP.

303. The V-CP sends the LBO policy to the visited core network user plane V-UP.

The visited core network control plane V-CP delivers the received LBO policy to the visited core network user plane V-UP, so that the LBO policy is installed on the V-UP to implement local breakout processing for the CDN service.

It should be noted that the V-CP further forwards the received LBO policy to the V-UP by using a visited session management function (V-SMF) entity, so that the LBO policy is installed on the V-UP. In addition, after the LBO policy is successfully installed on the V-UP, a protocol data unit session modification response (PDU Session modification Response) message is sent to a home session management function (H-SMF) entity.

In this embodiment of this application, when accessing the visited CDN server, the terminal may directly perform local breakout on the V-UP based on the visited CDN local breakout policy pushed by the H-CP. In this way, the visited CDN server can be accessed without a need to return, to the H-UP, a data flow correspondingly generated by the terminal and then loop the data flow back, thereby reducing inter-network traffic consumption between the roaming location and a home location, implementing a local breakout capability of the terminal at the roaming location, and improving service quality.

Figure 4:
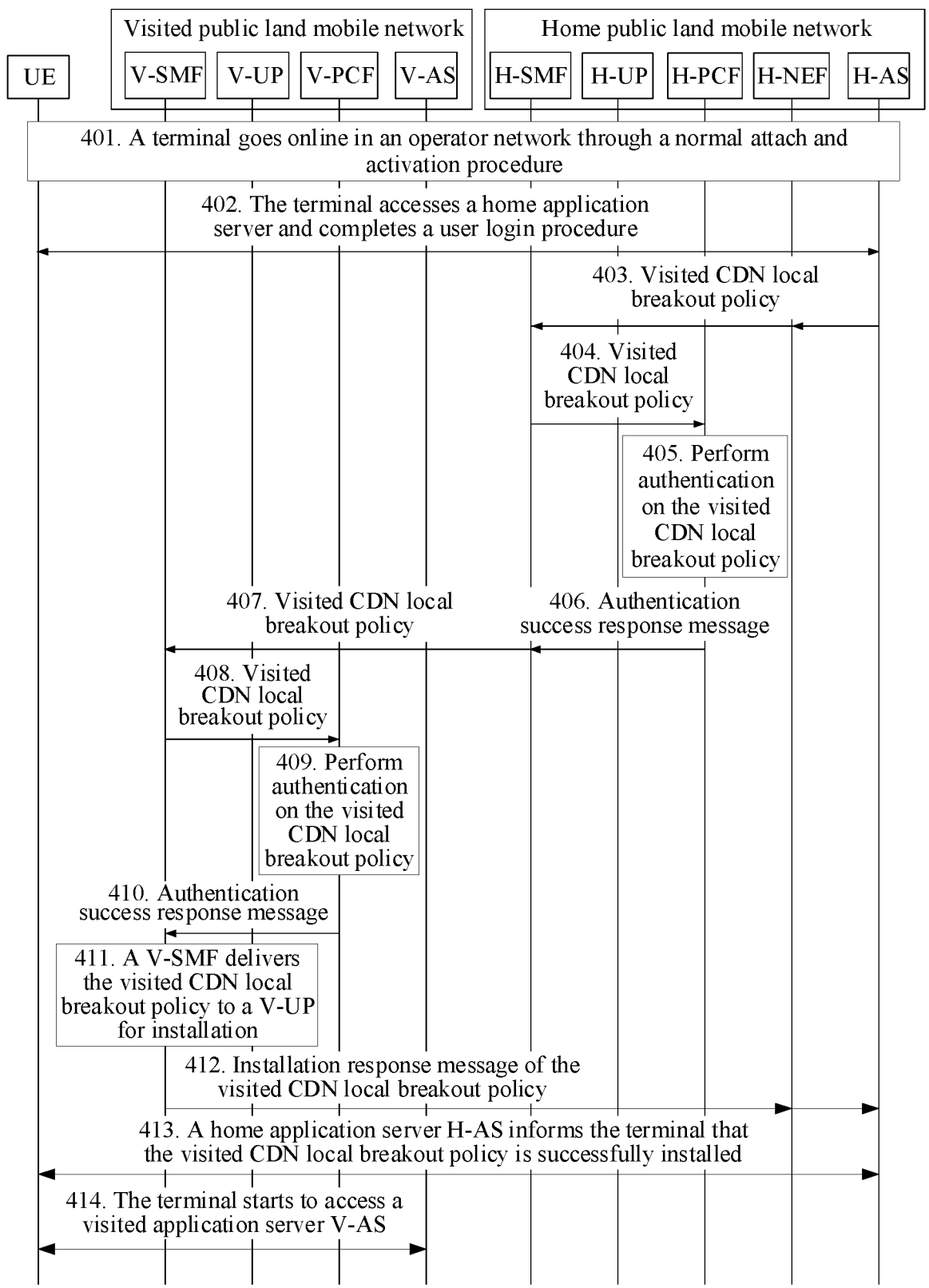
FIG. 4 is a schematic diagram of another embodiment of an offloading method in a roaming scenario according to an embodiment of this application.

For ease of understanding, a specific procedure in this embodiment of this application is described below. Referring to FIG. 4, another embodiment of an offloading method in a roaming scenario in this embodiment of this application includes the following steps.

401. The terminal goes online in an operator network through a normal attach and activation procedure.

The terminal goes online in the operator network through the normal attach and activation procedure, to access a data service.

It should be noted that, the OTT service provider accessed by the terminal successfully subscribes to the roaming local breakout service package of the home operator by using a subscription system provided by a capability exposure function of the operator, and a security grant module in the capability exposure system of the home operator allocates, to the OTT, a corresponding initial key and a roaming local breakout service package identifier that can be open.

402. The terminal accesses a home application server and completes a user login procedure.

When the terminal uses the app to which OTT subscribing to the roaming local breakout service package of the operator belongs, the app initiates a user login procedure on the home application server H-AS by using an encrypted service flow.

It should be noted that, after the home application server completes a user login authentication procedure for the terminal, the terminal reports a roaming status of the terminal to the home application server by using the app. The home application server determines that the terminal complies with the permission to use the roaming local breakout service package subscribed to by the terminal, and a CDN server exists in the roaming location. In this case, the home application server first generates a dynamic key based on the initial key issued by the security grant module of the operator, encapsulates the visited CDN local breakout policy (flow description information of the local breakout policy indicates that the visited CDN server serves as a target server address) based on the dynamic key, and sends encapsulated visited CDN local breakout policy to a network capability exposure function (NEF) entity of the home core network control plane H-CP, to implement installation of the visited CDN local breakout LBO policy. The visited CDN local breakout policy is referred to as the LBO policy.

403. The NEF of the home core network control plane H-CP sends the visited CDN local breakout policy to the home session management function H-SMF entity.

After the home core network control plane H-CP obtains the visited CDN local breakout policy from the home application server, the NEF of the H-CP sends the visited CDN local breakout policy to the home session management function H-SMF entity.

It should be noted that in this embodiment of this application, reference may be made to descriptions of the Home-routed Roaming chapter in 4.3.2.2.2 of the standard protocol 23502 of the 3rd generation partnership project (3GPP), and a first message (that is, a PDU Session modification Request message) from the H-SMF to the V-SMF is added. The message may carry information about the visited CDN local breakout policy pushed by the H-SMF to the V-SMF.

404. The H-SMF sends the visited CDN local breakout policy to the H-PCF for authentication.

After receiving the information about the visited CDN local breakout policy carried in the first message, the H-SMF sends the visited CDN local breakout policy to the H-PCF for authentication.

It should be noted that the first message may further carry grant information of a home operator, to ensure information security in a transmission process.

405. The H-PCF performs authentication on the visited CDN local breakout policy.

The H-PCF determines whether the visited CDN local breakout policy (and the grant information of the home operator) is valid, and sends an authentication result to the H-SMF. Specifically, if the visited CDN local breakout policy (and the grant information of the home operator) is valid, the H-PCF performs step 406. If the visited CDN local breakout policy (and the grant information of the home operator) is invalid, the H-PCF feeds back an authentication failure response message to the H-SMF.

It should be noted that an OTT service provider serving the terminal has subscribed to a visited local breakout service package of the home operator, and the home operator has signed a service opening collaboration agreement with the roaming operator.

406. The H-PCF sends an authentication success response message to the H-SMF.

The H-PCF sends an authentication success response message to the H-SMF, and the authentication success response message carries the visited CDN local breakout policy. It may be understood that the authentication success response message may also carry grant information of the home operator.

407. The H-SMF sends a visited CDN local breakout policy to the V-SMF.

The H-SMF sends a visited CDN local breakout policy to the V-SMF. A network interface is opened between the H-SMF and the V-SMF, and supports transfer of the visited CDN local breakout policy of a roaming subscriber, to implement local breakout processing for a visited CDN service at the roaming location.

408. The V-SMF forwards the received visited CDN local breakout policy to the V-PCF.

The V-SMF forwards the received visited CDN local breakout policy to the V-PCF, and performs authentication on the visited CDN local breakout policy by using the V-PCF. It may be understood that while the V-SMF further receives the grant information of the home operator, the V-SMF simultaneously forwards the grant information of the home operator to the V-PCF.

409. The V-PCF performs authentication on the visited CDN local breakout policy.

After receiving the information about the visited CDN local breakout policy, the V-PCF determines whether the visited CDN local breakout policy is valid; and if the visited CDN local breakout policy is valid, step 410 is performed; or if the visited CDN local breakout policy is invalid, the V-PCF feeds an authentication failure response message back to the V-SMF.

It should be noted that when further receiving the grant information of the home operator, the V-PCF needs to simultaneously perform authentication on the grant information of the home operator. The home operator has signed a service opening collaboration agreement with the roaming operator.

410. The V-PCF sends an authentication success response message to the V-SMF.

When the V-PCF determines that the visited CDN local breakout policy is valid, the V-PCF sends an authentication success response message to the V-SMF, and the home operator has signed the service opening collaboration agreement with the roaming operator.

411. The V-SMF delivers the visited CDN local breakout policy to the V-UP for installation.

When the V-SMF receives the authentication success response message sent by the V-PCF, the V-SMF delivers the visited CDN local breakout policy to the V-UP for installation, and after the V-UP successfully installs the visited CDN local breakout policy, the V-SMF returns an installation response message (PDU Session modification Response) of the visited CDN local breakout policy to the H-SMF.

412. The H-SMF sends the installation response message of the visited CDN local breakout policy to a home application server H-AS by using the H-NEF.

The H-SMF first sends the installation response message of the visited CDN local breakout policy to a home network capability exposure function H-NEF entity, and sends the installation response message of the visited CDN local breakout policy to the home application server H-AS by using the NEF.

413. The home application server H-AS informs the terminal that the visited CDN local breakout policy is successfully installed, and informs the terminal that the terminal may start to access the visited application server V-AS deployed at the roaming location.

The home application server H-AS informs the terminal that the visited CDN local breakout policy is successfully installed, and informs the terminal that the terminal may start to access the visited application server V-AS deployed at the roaming location.

414. The terminal starts to access the visited application server V-AS.

When the V-UP successfully installs the visited CDN local breakout policy, the terminal starts to access the V-UP, and if the V-UP determines that a server address accessed by the terminal is the same as a target server address defined in flow description information of a local breakout policy, the V-UP performs the visited CDN local breakout policy, and distributes a service flow of the terminal to the visited application server V-AS.

In this embodiment of this application, when accessing the visited CDN server, the terminal may directly perform local breakout on the V-UP at the roaming location based on the visited CDN local breakout policy pushed by the H-CP, and in this way, the visited CDN server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 5:
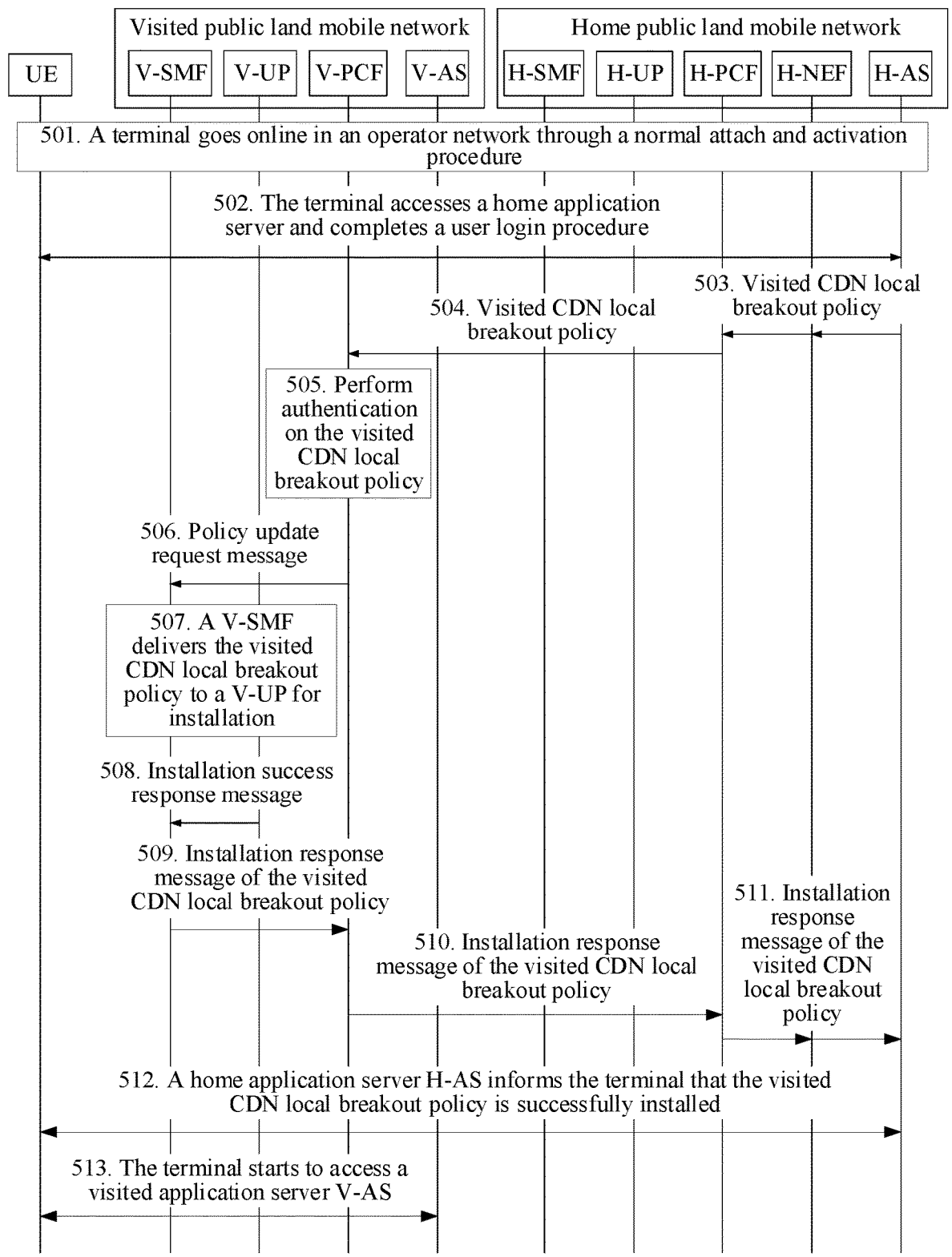
FIG. 5 is a schematic diagram of another embodiment of an offloading method in a roaming scenario according to an embodiment of this application.

Referring to FIG. 5, another manner in which a home core network control plane pushes a visited CDN local breakout policy to a visited core network control plane is shown. Another embodiment of an offloading method in a roaming scenario in this embodiment of this application includes the following steps.

501. The terminal goes online in an operator network through a normal attach and activation procedure.

The terminal goes online in the operator network through the normal attach and activation procedure, to access a data service.

It should be noted that, the OTT service provider accessed by the terminal successfully subscribes to the roaming local breakout service package of the home operator by using a subscription system provided by a capability exposure function of the operator, and a security grant module in the capability exposure system of the home operator allocates, to the OTT, a corresponding initial key and a roaming local breakout service package identifier that can be open.

502. The terminal accesses a home application server and completes a user login procedure.

When the terminal uses the app to which OTT subscribing to the roaming local breakout service package of the operator belongs, the app initiates a user login procedure on the home application server H-AS by using an encrypted service flow.

It should be noted that, after the home application server completes a user login authentication procedure for the terminal, the terminal reports a roaming status of the terminal to the home application server by using the app. The home application server determines that the terminal complies with the permission to use the roaming local breakout service package subscribed to by the terminal, and a CDN server exists in the roaming location. In this case, the home application server first generates a dynamic key based on the initial key issued by the security grant module of the operator, encapsulates the visited CDN local breakout policy (flow description information of the local breakout policy indicates that the visited CDN server serves as a target server address) based on the dynamic key, and sends encapsulated visited CDN local breakout policy to an NEF entity of the home core network control plane H-CP, to implement installation of the visited CDN local breakout LBO policy. The visited CDN local breakout policy may be referred to as the LBO policy.

503. The NEF of the home core network control plane H-CP sends the visited CDN local breakout policy to the home policy control function H-PCF entity.

After the home core network control plane H-CP obtains the visited CDN local breakout policy from the home application server, the NEF of the H-CP sends the visited CDN local breakout LBO policy to the home policy control function H-PCF entity.

It should be noted that in this embodiment of this application, there are a plurality of manners in which the H-CP obtains the visited CDN local breakout policy. In addition to a manner of receiving, from the home application server H-AS, a message that carries the visited CDN local breakout policy, the visited CDN local breakout policy may further be configured by using the home session management function H-SMF entity, or the visited CDN local breakout policy is obtained from the home policy control function H-PCF entity. This is not specifically limited herein.

504. The H-PCF sends the visited CDN local breakout policy to the V-PCF.

After receiving information about the visited CDN local breakout policy, the H-PCF sends the visited CDN local breakout policy to the V-PCF.

It should be noted that the message that carries the visited CDN local breakout policy may further carry grant information of a home operator, to ensure information security in a transmission process.

505. The V-PCF performs authentication on the visited CDN local breakout policy.

The V-PCF determines whether the visited CDN local breakout policy (and the grant information of the home operator) is valid, and sends an authentication result to the V-SMF. Specifically, if the visited CDN local breakout policy (and the grant information of the home operator) is valid, the V-PCF performs step 506. If the visited CDN local breakout policy (and the grant information of the home operator) is invalid, the V-PCF feeds back an authentication failure response message to the V-SMF.

It should be noted that an OTT service provider has subscribed to a visited local breakout service package of the home operator, and the home operator has signed a service opening collaboration agreement with the roaming operator.

506. The V-PCF sends a policy update request message to the V-SMF.

The V-PCF sends a policy update request message to the V-SMF. The policy update request message carries the visited CDN local breakout policy. It may be understood that the policy update request message may also carry the grant information of the home operator.

507. The V-SMF delivers the visited CDN local breakout policy to the V-UP for installation.

After the V-SMF receives the policy update request message sent by the V-PCF, the V-SMF delivers the visited CDN local breakout policy to the V-UP for installation.

508. The V-UP sends an installation success response message to the V-SMF.

After the V-UP successfully installs the visited CDN local breakout policy, the V-UP sends an installation success response message to the V-SMF, and the installation success response message is used to indicate that the visited CDN local breakout policy is successfully installed on the V-UP.

509. The V-SMF sends the installation success response message of the visited CDN local breakout policy to the V-PCF.

After the V-SMF receives the installation success response message of the visited CDN local breakout policy from the V-UP, the V-SMF forwards the installation success response message of the visited CDN local breakout policy to the V-PCF.

510. The V-PCF sends the installation success response message of the visited CDN local breakout policy to the H-PCF.

After the V-PCF receives the installation success response message of the visited CDN local breakout policy from the V-SMF, the V-PCF forwards the installation success response message of the visited CDN local breakout policy to the H-PCF.

511. The H-PCF sends the installation response message of the visited CDN local breakout policy to a home application server H-AS by using the H-NEF.

After the H-PCF receives the installation success response message of the visited CDN local breakout policy from the V-PCF, the H-PCF first sends the installation response message of the visited CDN local breakout policy to the home network capability exposure function H-NEF entity, and then sends the installation response message of the visited CDN local breakout policy to the home application server H-AS by using the NEF.

512. The home application server H-AS informs the terminal that the visited CDN local breakout policy is successfully installed, and informs the terminal that the terminal may start to access the visited application server V-AS deployed at the roaming location.

The home application server H-AS informs the terminal that the visited CDN local breakout policy is successfully installed, and informs the terminal that the terminal may start to access the visited application server V-AS deployed at the roaming location.

513. The terminal starts to access the visited application server V-AS.

When the V-UP successfully installs the visited CDN local breakout policy, the terminal starts to access the V-UP, and if the V-UP determines that a server address accessed by the terminal is the same as a target server address defined in flow description information of a local breakout policy, the V-UP performs the visited CDN local breakout policy, and distributes a service flow of the terminal to the visited application server V-AS.

In this embodiment of this application, when accessing the visited CDN server, the terminal may directly perform local breakout on the V-UP at the roaming location based on the visited CDN local breakout policy pushed by the H-CP, and in this way, the visited CDN server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 6:
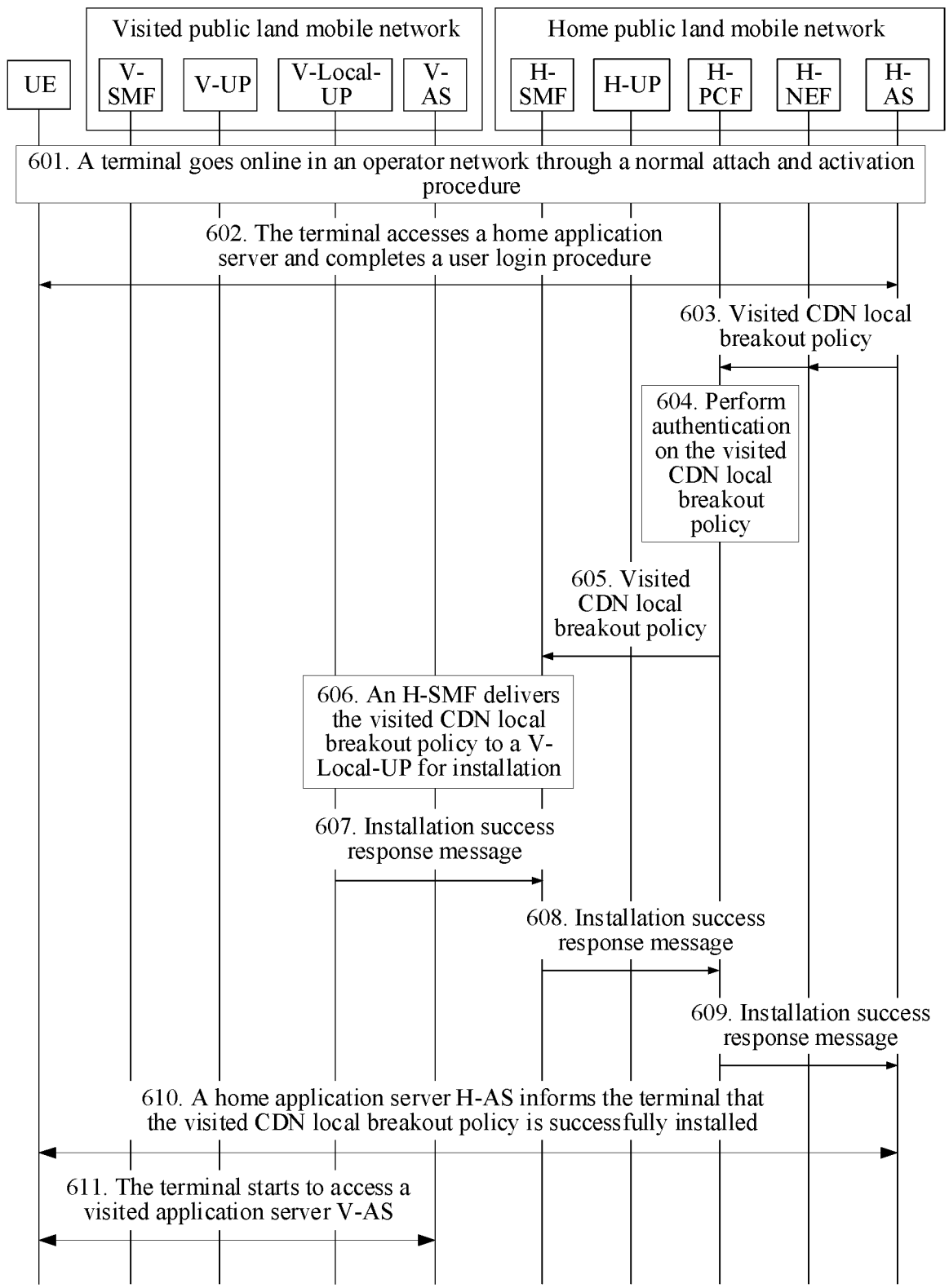
FIG. 6 is a schematic diagram of another embodiment of an offloading method in a roaming scenario according to an embodiment of this application.

Referring to FIG. 6, when applied to the network architecture shown in FIG. 2B, another embodiment of an offloading method in a roaming scenario in this embodiment of this application includes the following steps.

601. The terminal goes online in an operator network through a normal attach and activation procedure.

The terminal goes online in the operator network through the normal attach and activation procedure, to access a data service.

602. The terminal accesses a home application server and completes a user login procedure.

When the terminal uses the app to which OTT subscribing to the roaming local breakout service package of the operator belongs, the app initiates a user login procedure on the home application server H-AS by using an encrypted service flow.

Step 601 and step 602 are similar to step 301 and step 302. Details are not described herein again.

603. The NEF of the home core network control plane H-CP sends the visited CDN local breakout policy to the home policy control function H-PCF entity.

After the home core network control plane H-CP obtains the visited CDN local breakout policy from the home application server, the NEF of the H-CP sends the visited CDN local breakout policy to the home policy control function H-PCF entity.

604. The H-PCF performs authentication on the visited CDN local breakout policy.

The H-PCF determines whether the visited CDN local breakout policy (and the grant information of the home operator) is valid, and sends an authentication result to the home session management function H-SMF entity. Specifically, if the visited CDN local breakout policy (and the grant information of the home operator) is valid, the H-PCF performs step 605. If the visited CDN local breakout policy (and the grant information of the home operator) is invalid, the H-PCF feeds back an authentication failure response message to the home application server H-AS.

It should be noted that an OTT service provider serving the terminal has subscribed to a visited local breakout service package of the home operator, and the home operator has signed a service opening collaboration agreement with the roaming operator.

605. The H-PCF sends a visited CDN local breakout policy to the H-SMF.

After determining that the visited CDN local breakout policy is valid, the H-PCF sends the visited CDN local breakout policy to the H-SMF.

606. The H-SMF delivers the visited CDN local breakout policy to the visited local user plane V-Local-UP for installation.

After the H-SMF receives the visited CDN local breakout policy, the H-SMF delivers the received visited CDN local breakout policy to the visited local user plane V-Local-UP for installation.

607. The V-Local-UP sends an installation success response message to the H-SMF.

After the V-Local-UP successfully installs the visited CDN local breakout policy, the V-Local-UP sends an installation success response message to the H-SMF, and the installation success response message is used to indicate that the visited CDN local breakout policy is successfully installed on the V-Local-UP.

608. The H-SMF sends the installation success response message of the visited CDN local breakout policy to the H-PCF.

After the H-SMF receives the installation success response message of the visited CDN local breakout policy from the V-Local-UP, the H-SMF forwards the installation success response message of the visited CDN local breakout policy to the H-PCF.

609. The H-PCF sends the installation response message of the visited CDN local breakout policy to a home application server H-AS by using the H-NEF.

After the H-PCF receives the installation success response message of the visited CDN local breakout policy from the H-SMF, the H-PCF first sends the installation response message of the visited CDN local breakout policy to the home network capability exposure function H-NEF entity, and then sends the installation response message of the visited CDN local breakout policy to the home application server H-AS by using the NEF.

610. The home application server H-AS informs the terminal that the visited CDN local breakout policy is successfully installed, and informs the terminal that the terminal may start to access the visited application server V-AS deployed at the roaming location.

The home application server H-AS informs the terminal that the visited CDN local breakout policy is successfully installed, and informs the terminal that the terminal may start to access the visited application server V-AS deployed at the roaming location.

611. The terminal starts to access the visited application server V-AS.

Before the terminal starts to access the V-UP, the H-UP sends a notification message to the V-CP, the notification message is used to instruct to forward all services of the terminal at the roaming location to the deployed V-Local-UP, and the V-CP forwards the notification message to the V-UP by using a normal service procedure. After the V-Local-UP successfully installs the visited CDN local breakout policy, the terminal starts to access the V-UP. The V-UP sends all service procedures of the roaming subscriber to the V-Local-UP. If the V-Local-UP determines that a server address accessed by the terminal is consistent with a target server address defined in flow description information of the local breakout policy, the V-Local-UP executes the visited CDN local breakout policy, and distributes a service flow of the terminal to the visited application server V-AS. If the V-Local-UP determines that the server address accessed by the terminal is inconsistent with the target server address defined in the flow description information of the local breakout policy, that is, the service is an ordinary service, and the service flow of the terminal is distributed to the home application server H-AS.

It should be noted that a service flow of a non-subscribed service still needs to be forwarded to the H-UP for processing.

In this embodiment of this application, when accessing the visited CDN server, the terminal may directly perform, based on the visited CDN local breakout policy pushed by the H-CP, local breakout on the V-UP deployed at the roaming location, and in this way, the visited CDN server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 7:
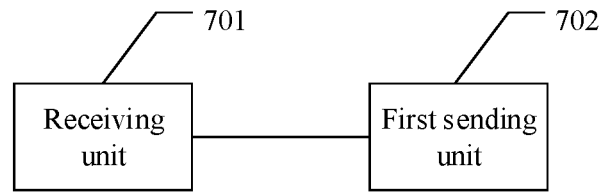
FIG. 7 is a schematic diagram of an embodiment of a network device according to an embodiment of this application.

The foregoing describes the offloading method in a roaming scenario in this embodiment of this application, and the following describes a network device in an embodiment of this application. Referring to FIG. 7, an embodiment of the network device in the embodiments of this application includes:

a receiving unit 701, configured to receive a first message sent by a home core network control plane H-CP, where the first message includes a local breakout LBO policy based on a subscribed service, and the subscribed service is a service on which local breakout needs to be performed and that is of a user; and a first sending unit 702, configured to send the LBO policy to a visited core network user plane V-UP, so that the LBO policy is installed on the V-UP to implement local breakout processing for the subscribed service.

In this embodiment of this application, the V-CP receives a local breakout policy of a subscribed service pushed by the H-CP, and performs local breakout on the V-UP based on the local breakout policy of the subscribed service. A visited server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 8:
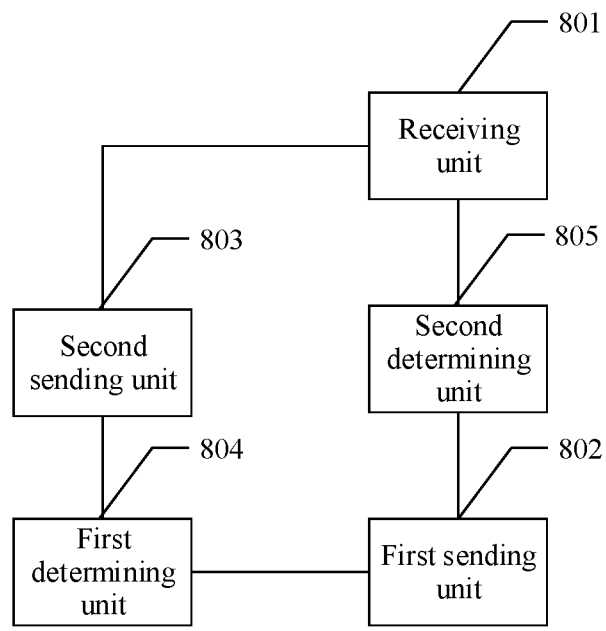
FIG. 8 is a schematic diagram of another embodiment of a network device according to an embodiment of this application.

Referring to FIG. 8, another embodiment of a network device in an embodiment of this application includes:

a receiving unit 801, configured to receive a first message sent by a home core network control plane H-CP, where the first message includes a local breakout LBO policy based on a subscribed service, and the subscribed service is a service on which local breakout needs to be performed and that is of a user; and a first sending unit 802, configured to send the LBO policy to a visited core network user plane V-UP, so that the LBO policy is installed on the V-UP to implement local breakout processing for the subscribed service.

Optionally, the receiving unit 801 is specifically configured to:

receive, by using a visited session management function V-SMF entity, a first message sent by a home session management function H-SMF entity, where the first message includes the LBO policy based on the subscribed service; or receive, by using a visited policy control function V-PCF entity, a first message sent by a home policy control function H-PCF entity, where the first message includes the LBO policy based on the subscribed service.

Optionally, the network device may further include:

a second sending unit 803, configured to send the LBO policy to the visited policy control function V-PCF entity by using the V-SMF; and a first determining unit 804, configured to determine, by using the V-PCF, whether the LBO policy is valid.

Optionally, the network device may further include:

a second determining unit 805, configured to determine, by using the V-PCF, whether the LBO policy is valid.

Optionally, the first sending unit 802 is specifically configured to:

send the LBO policy to the V-UP by using the V-SMF.

In this embodiment of this application, the V-CP receives a local breakout policy of a subscribed service pushed by the H-CP, and performs local breakout on the V-UP based on the local breakout policy of the subscribed service. A visited server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 9:
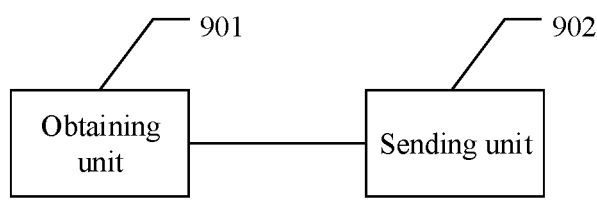
FIG. 9 is a schematic diagram of another embodiment of a network device according to an embodiment of this application.

Referring to FIG. 9, another embodiment of a network device in an embodiment of this application includes:

an obtaining unit 901, configured to obtain a local breakout LBO policy based on a subscribed service, where the subscribed service is a service on which local breakout needs to be performed and that is of a user; and a sending unit 902, configured to send a first message to a visited core network control plane V-CP, where the first message includes the LBO policy.

In this embodiment of this application, the H-CP obtains the local breakout policy of the subscribed service, and pushes the local breakout policy of the subscribed service to the V-CP, so that the local breakout policy of the subscribed service is installed at the roaming location to implement local breakout. A visited server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 10:
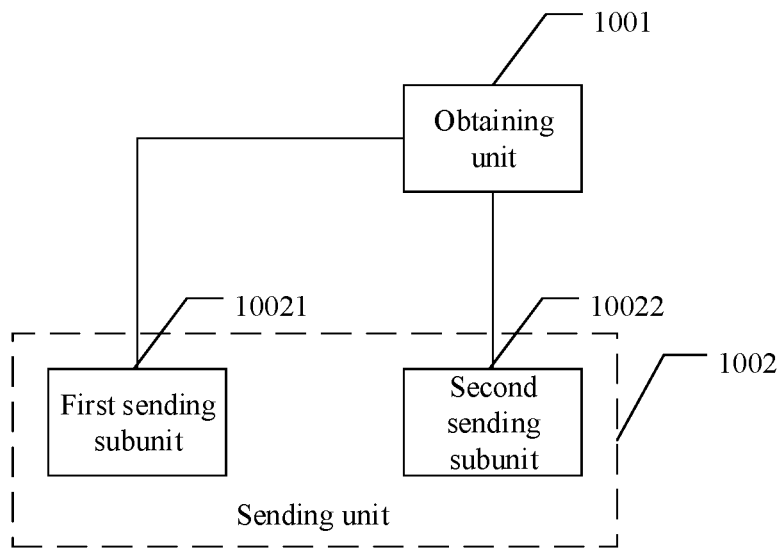
FIG. 10 is a schematic diagram of another embodiment of a network device according to an embodiment of this application.

Referring to FIG. 10, another embodiment of a network device in an embodiment of this application includes:

an obtaining unit 1001, configured to obtain a local breakout LBO policy based on a subscribed service, where the subscribed service is a service on which local breakout needs to be performed and that is of a user; and a sending unit 1002, configured to send a first message to a visited core network control plane V-CP, where the first message includes the LBO policy.

Optionally, the sending unit 1002 may further include:

a first sending subunit 10021, configured to send a first message to a visited session management function V-SMF entity by using a home session management function H-SMF entity, where the first message includes the LBO policy.

Optionally, the sending unit 1002 may further include:

a second sending subunit 10022, configured to send the first message to a visited policy control function V-PCF entity by using a home policy control function H-PCF entity, where the first message includes the LBO policy.

Optionally, the obtaining unit 1001 is specifically configured to:

configure the LBO policy by using the home session management function H-SMF entity;

receive a second message sent by a home application server H-AS, where the second message includes the LBO policy; or obtain the LBO policy from the home policy control function H-PCF entity.

In this embodiment of this application, the H-CP obtains the local breakout policy of the subscribed service, and pushes the local breakout policy of the subscribed service to the V-CP, so that the local breakout policy of the subscribed service is installed at the roaming location to implement local breakout. A visited server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 11:
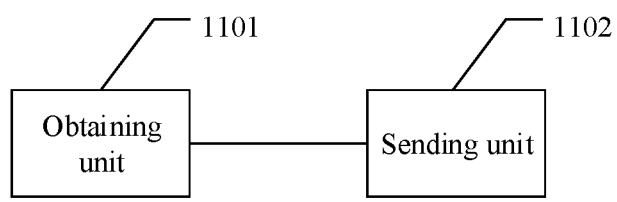
FIG. 11 is a schematic diagram of another embodiment of a network device according to an embodiment of this application.

Referring to FIG. 11, another embodiment of a network device in an embodiment of this application includes:

an obtaining unit 1101, configured to obtain a local breakout LBO policy based on a subscribed service, where the subscribed service is a service on which local breakout needs to be performed and that is of a user; and a sending unit 1102, configured to send a first message to a visited local user plane V-Local-UP, where the first message includes the LBO policy, so that traffic of the subscribed service is offloaded to a visited application server V-AS.

Optionally, the sending unit 1102 is specifically configured to:

send the first message to the visited local user plane V-Local-UP by using a home session management function H-SMF entity.

In this embodiment of this application, the H-CP obtains the local breakout policy of the subscribed service, and pushes the local breakout policy of the subscribed service to the V-Local-UP, so that the local breakout policy of the subscribed service is installed at the roaming location to implement local breakout. A visited server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 12:
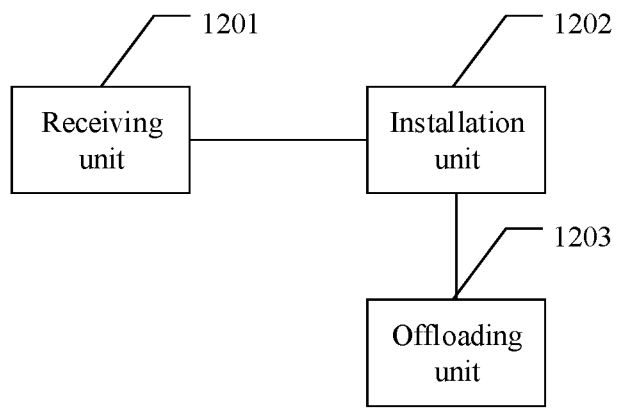
FIG. 12 is a schematic diagram of another embodiment of a network device according to an embodiment of this application.

Referring to FIG. 12, another embodiment of a network device in an embodiment of this application includes:

a receiving unit 1201, configured to receive a local breakout LBO policy that is based on a subscribed service and that is sent by a home core network control plane H-CP, where the subscribed service is a service on which local breakout needs to be performed and that is of a user;

an installation unit 1202, configured to install the LBO policy; and an offloading unit 1203, configured to: if the V-Local-UP determines that a service sent by a visited core network user plane V-UP is a subscribed service, offload traffic of the subscribed service to a visited application server V-AS.

Optionally, the receiving unit 1201 is specifically configured to:

receive a local breakout LBO policy that is based on the subscribed service and that is sent by a home session management function H-SMF entity.

In this embodiment of this application, the V-Local-UP receives a local breakout policy of a subscribed service pushed by the H-CP, and performs local breakout on the V-Local-UP based on the local breakout policy of the subscribed service. A visited server is further accessed without a need to return, to the H-UP, a data flow correspondingly generated by the terminal and loop the data flow back, thereby reducing inter-network traffic consumption between the roaming location and the home location, implementing a local breakout capability of the terminal at the roaming location, and improving service quality.

Figure 13:
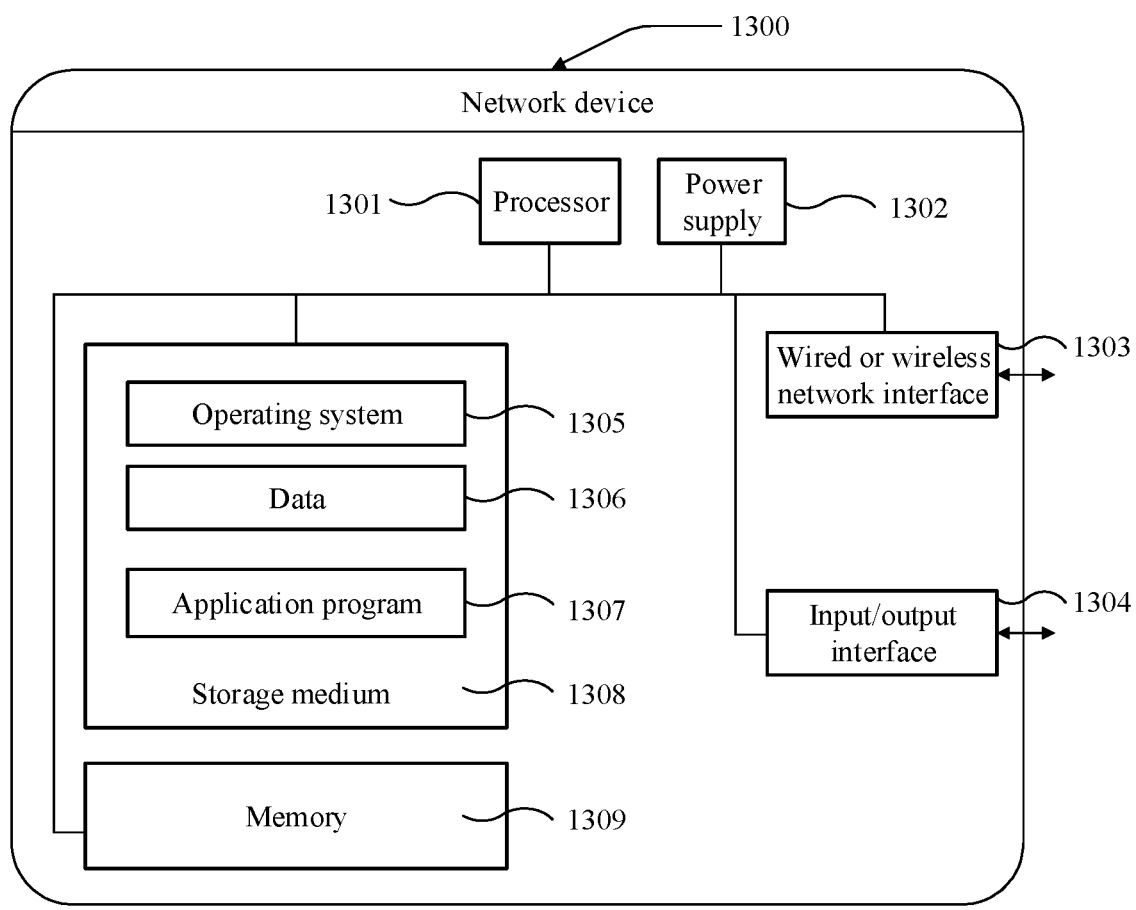
FIG. 13 is a schematic diagram of another embodiment of a network device according to an embodiment of this application.

FIG. 7 to FIG. 12 above separately describe in detail the network device in this embodiment of this application from a perspective of a modular function entity, and the following describes in detail the network device in this embodiment of this application from a perspective of hardware processing. Referring to FIG. 13, another embodiment of a network device in an embodiment of this application includes:

FIG. 13 is a schematic structural diagram of a network device according to an embodiment of this application. Relatively large differences in the network device 1300 may be generated because of configuration or performance differences. The network device 1300 may include one or more processors (central processing units, CPU) 1301 (for example, one or more processors), one or more memories 1309, and one or more storage media 1308 (for example, one or more mass storage devices) for storing an application program 1307 or data 1306. The memory 1309 and the storage medium 1308 each may be a transitory storage or a persistent storage. The program stored in the storage medium 1308 may include one or more modules (not shown in the figure). Each module may include a series of instruction operations for the network device. Further, the processor 1301 may be configured to: communicate with the storage medium 1308, and perform, on the network device 1300, a series of instruction operations in the storage medium 1308.

The network device 1300 may further include one or more power supplies 1302, one or more wired or wireless network interfaces 1303, one or more input/output interfaces 1304, and/or one or more operating systems 1305, such as Windows Server, Mac OS X, Unix, Linux, or FreeBSD. A person skilled in the art may understand that a structure of the network device shown in FIG. 13 constitutes no limitation on the network device, and the network device may include more or fewer parts than those shown in the figure, or a combination of some parts, or parts disposed differently.

The following describes each component of the network device in detail with reference to FIG. 13.

The memory 1309 may be configured to store a software program and a module, and the processor 1301 runs the software program and the module that are stored in the memory 1309, to perform various functional applications of the network device and data processing. The memory 1309 may mainly include a program storage area and a data storage area. The program storage area may store an operating system, an application program required by at least one function (such as an authentication function), and the like. The data storage area may store data (such as a visited CDN local breakout policy and grant information of a home operator) created based on use of the network device, and the like. In addition, the memory 1309 may include a high-speed random access memory, and may further include a nonvolatile memory, for example, at least one magnetic disk storage device, a flash storage device, or another volatile solid-state storage device. A program of an offloading method in a roaming scenario provided in this embodiment of this application and a received data flow are stored in the memory 1309, and are invoked by the processor 1301 from the memory 1309 when the program and the data flow need to be used.

The processor 1301 is a control center of the network device, and may perform service offloading based on a set offloading method. The processor 1301 is connected to all parts of the entire network device by using various interfaces and lines, and perform various functions of the network device and data processing by running or executing the software program and/or the module that are/is stored in the memory 1309 and by invoking data stored in the memory 1309, to implement offloading of a data flow of a roaming service in a roaming scenario.

The computer program product includes one or more computer instructions. When the computer program instructions are loaded and executed on the computer, the procedure or functions according to the example, non-limiting embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state disk (SSD)), and or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. A computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A traffic offloading method in a roaming scenario, comprising:

receiving, by a visited core network control plane (V-CP), a first message from a home core network control plane (H-CP), wherein the first message comprises a local breakout (LBO) policy based on a subscribed service, and the subscribed service is a service on which local breakout needs to be performed and the subscribed service is subscribed to by a user; and sending, by the V-CP, the LBO policy to a visited core network user plane (V-UP), so that the LBO policy is installed on the V-UP to implement local breakout processing for the subscribed service; wherein:

the receiving, by the V-CP, of the first message from the H-CP comprises:
  receiving, by the V-CP by using a visited session management function (V-SMF) entity, the first message sent by a home session management function (H-SMF) entity; or
  receiving, by the V-CP by using a visited policy control function (V-PCF) entity, the first message sent by a home policy control function (H-PCF) entity the method further comprises:
  installing the LBO policy on the V-UP,
  if the V-UP determines that a service is the subscribed service, offloading, by the V-UP, traffic of the subscribed service to a visited application server (V-AS) using the LBO policy, and
  if the V-UP determines that a service is an ordinary service, distributing a service flow of a terminal to a home application server (H-AS).

2. The method according to claim 1, wherein the method further comprises:
  sending, by the V-CP, the LBO policy to the V-PCF entity by using the V-SMF entity; and
  determining, by the V-CP by using the V-PCF entity, whether the LBO policy is valid.

3. The method according to claim 1, wherein the method further comprises:
  determining, by the V-CP by using the V-PCF, whether the LBO policy is valid.

4. The method according to claim 1, wherein the sending, by the V-CP, the LBO policy to the V-UP comprises:
  sending, by the V-CP, the LBO policy to the V-UP by using the V-SMF entity.

5. The method according to claim 1, wherein the sending, by the H-CP, the first message to the V-CP comprises:
  sending, by the H-CP, the first message to the visited session management function (V-SMF) entity by using the home session management function (H-SMF) entity.

6. The method according to claim 1, wherein the sending, by the H-CP, the first message to the V-CP comprises:
  sending, by the H-CP, the first message to the visited policy control function (V-PCF) entity by using the home policy control function (H-PCF) entity.

7. The method according to claim 1, wherein the method further comprises:
  obtaining, by the H-CP, the LBO policy.

8. The method according to claim 7, wherein the obtaining, by the H-CP, the LBO policy comprises:
  configuring, by the H-CP, the LBO policy by using a home session management function (H-SMF) entity;
  receiving, by the H-CP, a second message from the home application server (H-AS), wherein the second message comprises the LBO policy; or
  obtaining, by the H-CP, the LBO policy from a home policy control function (H-PCF) entity.

9. The method according to claim 1, wherein the first message comprises grant information of an operator at a roaming location.

10. A traffic offloading system, comprising a home core network control plane (H-CP) and a visited core network control plane (V-CP),
  the V-CP is configured to: receive a first message sent to the V-CP from the H-CP, wherein the first message comprises a local breakout (LBO) policy based on a subscribed service, and the subscribed service is a service on which local breakout needs to be performed and the subscribed service is subscribed to by a user;
  the V-CP is further configured to: send the LBO policy to a visited core network user plane (V-UP), so that the LBO policy is installed on the V-UP to implement local breakout processing for the subscribed service; and
  the V-CP is further configured to: receive, by using a visited session management function (V-SMF) entity, the first message sent by a home session management function (H-SMF) entity; or receive, by using a visited policy control function (V-PCF) entity, the first message sent by a home policy control function (H-PCF) entity; and
  wherein the traffic offloading system is configured to:
    install the LBO policy on the V-UP,
    if the V-UP determines that a service is the subscribed service, offload, by the V-UP, traffic of the subscribed service to a visited application server (V-AS) using the LBO policy, and
    if the V-UP determines that a service is an ordinary service, distributing a service flow of a terminal to a home application server (H-AS).

11. The system according to claim 10, wherein the V-CP is configured to: send the LBO policy to the V-PCF entity by using the V-SMF entity; and determine, by using the V-PCF entity, whether the LBO policy is valid.

12. The system according to claim 10, wherein the V-CP is configured to: determine, by using the V-PCF, whether the LBO policy is valid.

13. The system according to claim 10, wherein the V-CP is configured to: send the LBO policy to the V-UP by using a visited session management function (V-SMF) entity.

14. The system according to claim 10, wherein the V-CP is configured to: send the first message to the visited session management function (V-SMF) entity by using the home session management function (H-SMF) entity.

15. The system according to claim 10, wherein the H-CP is configured to: send the first message to the visited policy control function (V-PCF) entity by using the home policy control function (H-PCF) entity.

16. The system according to claim 10, wherein the H-CP is configured to: obtain the LBO policy.

17. A visited core network control plane (V-CP), the V-CP comprises:
  at least one processor, and a memory storing computer-executable instructions;
  wherein the computer-executable instructions, when executed by the at least one processor, further cause the V-CP to:
  receive a first message from a home core network control plane (H-CP), wherein the first message comprises a local breakout (LBO) policy based on a subscribed service, and the subscribed service is a service on which local breakout needs to be performed and the subscribed service is subscribed to by a user;

send the LBO policy to a visited core network user plane (V-UP), so that the LBO policy is installed on the V-UP to implement local breakout processing for the subscribed service; and receive, by using a visited session management function (V-SMF) entity, the first message from a home session management function (H-SMF) entity; or receive, by using a visited policy control function (V-PCF) entity, the first message from a home policy control function (H-PCF) entity;

wherein the LBO policy sent from the V-CP is installed on the V-UP so that upon determination that a service is the subscribed service, traffic of the subscribed service is offloaded by the V-UP to a visited application server (V-AS) using the LBO policy sent from the V-CP, and upon determination that a service is an ordinary service, a service flow of a terminal is distributed to a home application server (H-AS).

* * * * *